United States Patent Office 2,704,708
Patented Mar. 22, 1955

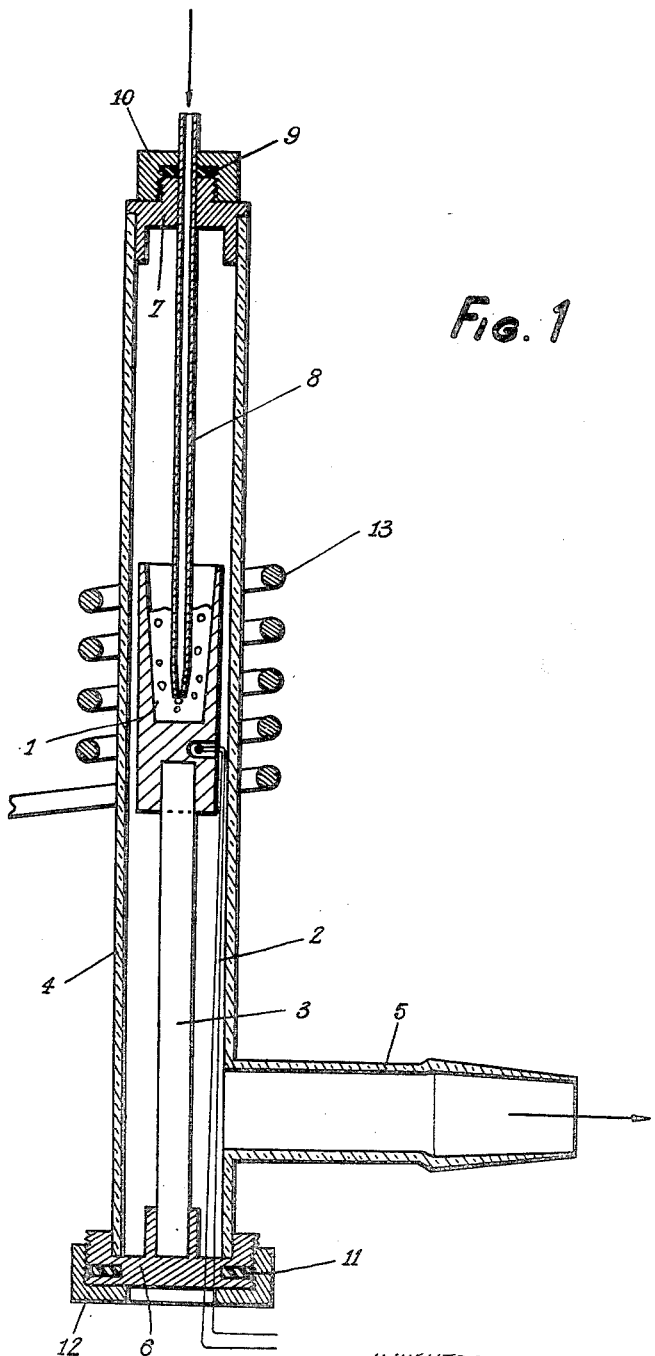

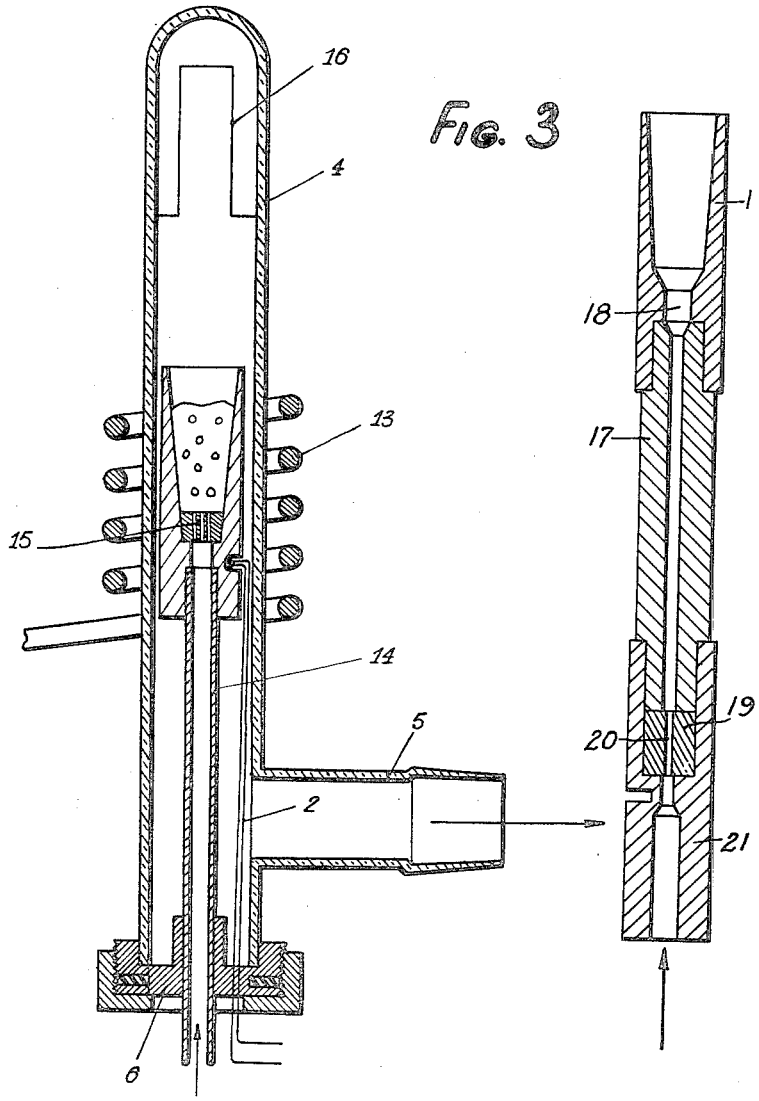

2,704,708

METHOD FOR THE PREPARATION OF GERMANIUM

Heinrich Welker, Vaucresson, France, assignor to Societe Anonyme dite: Compagnie des Freins et Signaux Westinghouse, Paris, France Application August 11, 1949, Serial No. 109,751

2 Claims. (Cl. 75—134)

This invention relates generally to the preparation of germanium (Ge) and more particularly to a novel method of and apparatus for the preparation of germanium.

It is known that from the germanium element (Ge) and more specifically from spectroscopically pure germanium, asymetrically conductive devices, more commonly called "rectifiers" can be constructed, which are particularly interesting in comparison with rectifiers made from other semi-conductors, because of their reduced overall dimensions. If the voltage/current characteristics of rectifiers operating with germanium are compared, considerable differences will be found in the values of these electric characteristics. Notably, for example, the so-called "direct" current under a 1-volt voltage as well as the maximum so-called "inverse" voltage which the rectifier is capable of withstanding, are quite different from one sample to another although both samples may be considered as highly pure.

Specific tests have demonstrated that there is a relation between the electric conductivity of a mass or bar of germanium and the rectifying action which could be expected therefrom. In particular, a high conductivity is related to the possibilities of obtaining a high direct current and a low inverse voltage while a low conductivity determines a relatively low direct current associated with a high inverse voltage.

It is already known that it is possible to increase the inverse voltage by adding to the germanium predetermined amounts of other suitable bodies or substances.

It is also known that that inverse voltage may be considerably increased by melting the germanium in a neutral atmosphere such as nitrogen. A similar result will be obtained by adding to the germanium traces of certain metals such as tin. Both methods may be carried into effect simultaneously or in any other suitable manner. The chief drawback offered by the method of melting the germanium in neutral atmosphere is that the equilibrium between the molten germanium and the nitrogen for example occurs rather slowly.

On the other hand, it is rather delicate properly to add certain metal impurities such as tin because it is difficult to adequately distribute the added substance within the mass of germanium.

It is an object of the invention to remedy the aforesaid drawbacks and to modify the properties of pure germanium so as to obtain particular electric features.

For this purpose, and in accordance with a main feature of the invention, very generally, the electric properties of germanium are modified by causing a neutral gaseous flux to pass through the molten mass of germanium, said neutral gaseous flux being preferably composed of nitrogen or a nitrogen-containing gas.

This treatment, which is of substantially physical character, is also intended, with the assistance of said gaseous flux, for carrying away impurities which are relatively readily vaporizable such as arsenic: it is known that traces of this substance will considerably modify the conductivity of germanium according to the content thereof.

One advantage of this method of blowing a neutral gaseous flux through the mass of molten germanium is that the stirring action thus produced will ensure a suitable distribution of certain metal substances such as tin which are frequently added to the mass of molten germanium according to a well known technique as explained hereinabove.

Finally, another advantage offered by this method compared with that of melting the germanium in neutral atmosphere is that the equilibrium between the molten germanium and the neutral gas is established very rapidly.

With the treatment indicated above it is also possible in particular to increase the value of the "inverse" voltage of the germanium to the desired extent and according to the duration of passage of the gaseous flow, whereby the desired electric characteristics may be imparted to the germanium.

According to another feature of the method according to the invention, the amount of gas dissolved within the molten germanium is increased by introducing the gaseous flow at a temperature slightly below the solidification point of germanium before the germanium solidifies.

This method is especially advantageous for obtaining particular qualities in the final semi-conductor. This may be observed, in particular, when a gaseous flow which forms $Ge_3N_2$ or $Ge_3N_4$ is used.

This invention is also concerned with an apparatus for carrying out the above-described method. The apparatus has the following characteristics either single or in any combination:

1. The apparatus comprises a crucible of graphite, into which the germanium is placed. The crucible is put into an enclosure connected to a vacuum pump and provided with a nozzle for the passage of the gaseous flow through the mass of molten germanium. An external heating means such as an inductance operated heating coil is provided for melting the germanium.

2. The nozzle through which the gaseous flow is passed penetrates into the germanium-containing crucible from the open end thereof.

In another realization of the invention, the nozzle feeding the gaseous flow opens into the bottom of the crucible through small holes of such dimensions that the surface of the molten germanium will prevent any leakage of the germanium through these holes.

In still another realization of the invention, the bottom of the crucible communicates into a rod-casting mold, and this rod-casting mold is closed by a graphite plug having holes which are too small to allow the molten germanium to escape. These holes communicate with the nozzle for the passage of the gaseous flow.

In the drawings annexed to the specification several embodiments of the invention are shown in a schematical position and by way of example only. In the drawings:

Fig. 1 represents a vertical section of a first form of embodiment of the invention wherein the gaseous flow nozzle submerges into the molten germanium contained in the crucible.

Fig. 2 represents a similar section of another embodiment in which the gaseous flow is introduced through the bottom of the crucible; and Fig. 3 represents a similar section of a third form of embodiment as applied to the casting of rod shaped germanium. The enclosure into which crucible and mold assembly are placed is not shown.

Referring to Fig. 1, the apparatus utilized for applying the above-described method is shown to comprise a crucible 1 of pure graphite. This material is preferred for chemical reasons. The temperature of the crucible 1 is controlled for example by means of a thermo-electric element 2. Crucible 1 is supported on a rod 3, of steatite 1 for example, inside a quartz tube 4 connected through conduit or pipe 5 to a vacuum pump (not shown). Tube 4 is closed at both ends by plugs 6 and 7, respectively. A nozzle 8 (consisting for example of a capillary quartz tube) is inserted through the upper plug 7 and extends downwardly so that its lower end will be submerged into the molten germanium contained in crucible 1. Suitable means (not shown) are adapted to feed the nozzle 8 which serves to feed gaseous flow (such as nitrogen or nitrogen-containing gas). The gas, after having infiltrated in or bubbled through the germanium, will escape through the space defined by tube 4 from where it will be evacuated through pipe 5 by the vacuum pump.

In order to insure the necessary gas tightness for the passage of nozzle 8, a washer 9 for example of rubber is provided. Washer 9 is clamped by nut 10 which is screwed around a threaded portion of plug 7. Similarly, lower plug 6 is made gas-tight by means of a rubber washer 11 clamped by nut 12 screwed on a threaded portion of plug 6.

Crucible 1 is heated from the outside by means of induction coil 13.

The embodiment of Fig. 2 also comprises a crucible 1, a quartz tube 2 (but without any aperture in its upper portion) connected over pipe 5 with a vacuum pump, a heating coil 13, a lower plug 6 closing the lower end of the tube 4 and a thermo-electric element 2.

Here, however, the nozzle 14 through which the gaseous flow is fed, and which may be of steatite or other suitable material, opens into the bottom of the crucible through capillary channels 15 of dimensions so calculated that the surface tension of the molten germanium will prevent it from flowing through channels 15.

These channels 15 may be formed in a graphite plug 16. With the arrangement described it is possible to prevent the molten mass from contacting other undesired foreign bodies.

The germanium treated by the neutral gaseous flow may be collected by simply turning the apparatus upside down. The germanium will flow into a mold secured in any suitable manner to the upper portion of tube 4. This mold is shown in Fig. 2, at 16, in a diagrammatical fashion only and a germanium ingot is obtained therefrom.

In Fig. 3, there is illustrated another embodiment suitable for casting germanium in the shape of rods. It has not been found necessary, in this figure, to show quartz tube 4 and heating coil 13, both being similar to those shown in Figs. 1 and 2.

In this form of embodiment, the graphite crucible 1 is completed by an open mold 17 disposed thereunder and communicating with the bottom of crucible 1 through passage 18. If desired a removable plug having holes formed therein may be disposed in passage 18. This plug may be removed during melting. The lower portion of mold 17 is closed by plug 19 provided with capillary holes 20 permitting passage of the gaseous flow from nozzle 21 secured to mold 17 in any suitable manner. The body of nozzle 21 forms a support for mold 17.

A plurality of orifices (not visible in the drawing on account of their small dimensions) may connect nozzle 21 with channel 20 opening into the bottom of mold 17.

The long cylindrical or parallelipipedic geometric shape of the cavity of mold 17 will form thin germanium rods resembling pencil leads. This shape is specially advantageous for measuring electric conductivity and Hall effect. In addition, it facilitates the realization of small surfaces which are difficult to obtain by other means due to the hardness of the germanium.

With the various embodiments described above it is therefore possible as explained before to infiltrate the gaseous flow through the mass of molten germanium at a temperature slightly below the melting point and before the germanium commences to solidify due to the inertia of the solidification. For this purpose, for example, the heating coil 13 which assures the melting may be slowly raised and thereafter the gaseous flow introduced during the cooling of the molten mass.

It is well understood that with the method and apparatus described above, it is not only possible to realize germanium crystals having asymetric conductivity characteristics for the construction of diodes, but also other germanium crystals may be formed permitting for example the achievement of electronic relay effects.

What I claim is:

1. In a method of preparing germanium, the steps of heating the germanium to a temperature substantially above the point of solidification to cause it to be liquid, so slowly cooling down said germanium from said temperature substantially above the solidification point that it is maintained in its liquid state at a temperature substantially below the solidification point, and passing a substantially neutral gaseous flow through said germanium while it is maintained in said liquid state.

2. Method according to claim 1 wherein said gaseous flow is caused to bubble through said germanium in said liquid state.

References Cited in the file of this patent

UNITED STATES PATENTS

| | | |
|---|---|---|
| 2,261,516 | Franchot | Nov. 4, 1941 |
| 2,270,660 | Misfeldt | Jan. 20, 1942 |
| 2,390,052 | Bernstoff et al. | Dec. 4, 1945 |
| 2,447,829 | Whaley | Aug. 24, 1948 |
| 2,474,701 | Slottman | June 28, 1949 |
| 2,504,628 | Benzer | Apr. 18, 1950 |
| 2,505,633 | Whaley | Apr. 25, 1950 |
| 2,514,879 | Lark-Horovitz et al. | July 11, 1950 |

FOREIGN PATENTS

| | | |
|---|---|---|
| 632,942 | Great Britain | Dec. 5, 1949 |